(12) United States Patent
Zhao et al.

(10) Patent No.: US 8,254,699 B1
(45) Date of Patent: Aug. 28, 2012

(54) AUTOMATIC LARGE SCALE VIDEO OBJECT RECOGNITION

(75) Inventors: Ming Zhao, San Jose, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 879 days.

(21) Appl. No.: 12/364,390

(22) Filed: Feb. 2, 2009

(51) Int. Cl.
G06K 9/46 (2006.01)
G06K 9/48 (2006.01)
H04N 5/14 (2006.01)
G06E 1/00 (2006.01)

(52) U.S. Cl. ........ 382/224; 382/190; 382/197; 348/699; 706/20

(58) Field of Classification Search ............... 382/181, 382/190, 195, 197, 224, 155, 100, 128, 191, 382/203, 173, 232, 236, 226, 107; 707/999, 707/E17.028; 706/12, 16, 19, 20, 45, 15; 375/E7.11, 240.14, E7.026, 240; 348/699
See application file for complete search history.

(56) References Cited

U.S. PATENT DOCUMENTS

| | | | | |
|---|---|---|---|---|
| 5,850,470 A * | 12/1998 | Kung et al. | | 382/157 |
| 6,192,353 B1 * | 2/2001 | Assaleh et al. | | 706/20 |
| 6,397,200 B1 * | 5/2002 | Lynch et al. | | 706/20 |
| 6,774,917 B1 * | 8/2004 | Foote et al. | | 715/700 |
| 6,789,070 B1 * | 9/2004 | Willett et al. | | 706/20 |
| 7,120,292 B2 * | 10/2006 | Kunii et al. | | 382/159 |
| 7,246,314 B2 * | 7/2007 | Foote et al. | | 715/700 |
| 7,437,334 B2 * | 10/2008 | Forman et al. | | 706/12 |
| 7,587,374 B1 * | 9/2009 | Lynch et al. | | 706/16 |
| 7,593,551 B2 * | 9/2009 | Kamei | | 382/118 |
| 7,599,894 B2 * | 10/2009 | Owechko et al. | | 706/14 |

OTHER PUBLICATIONS

U.S. Appl. No. 11/840,139, filed with the United States Patent and Trademark Office on Aug. 16, 2007, 58 pages.

* cited by examiner

*Primary Examiner* — Sheela Chawan
(74) *Attorney, Agent, or Firm* — Fenwick & West LLP

(57) ABSTRACT

An object recognition system performs a number of rounds of dimensionality reduction and consistency learning on visual content items such as videos and still images, resulting in a set of feature vectors that accurately predict the presence of a visual object represented by a given object name within an visual content item. The feature vectors are stored in association with the object name which they represent and with an indication of the number of rounds of dimensionality reduction and consistency learning that produced them. The feature vectors and the indication can be used for various purposes, such as quickly determining a visual content item containing a visual representation of a given object name.

43 Claims, 4 Drawing Sheets

| Object name | $DR_0$ | $DR_1$ |
|---|---|---|
| Bat | $\{O_0, O_2, O_3\}$ | $\{O_0, O_2', O_3'\}$ |
| Cat | $\{O_1, O_4, O_5, O_6\}$ | $\{O_1, O_4', O_5\}$ |
| Dog | $\{O_1, O_6, O_7\}$ | $\{O_1, O_6, O_7\}$ |
| Penguin | $\{O_8, O_9, O_{10}\}$ | $\{O_8', O_9'\}$ |

*FIG. 3A*

| Object name | $DR_1$ | $CL_1$ |
|---|---|---|
| Bat | $\{O_0, O_2', O_3'\}$ | $\{O_0, O_2', O_3'\}$ |
| Cat | $\{O_1, O_4', O_5\}$ | $\{O_4', O_5\}$ |
| Dog | $\{O_1, O_6, O_7\}$ | $\{O_6, O_7\}$ |
| Penguin | $\{O_8', O_9'\}$ | $\{O_8', O_9'\}$ |

*FIG. 3B*

| Object name | Classification Model Features | Number of Rounds |
|---|---|---|
| Bat | $\{O_0, O_2'', O_3'\}$ | 7 |
| Cat | $\{O_4', O_5\}$ | 4 |
| Dog | $\{O_6', O_7\}$ | 3 |
| Penguin | $\{O_8', O_9''\}$ | 4 |

*FIG. 4*

Video $V_1$

| Object name | Probability |
|---|---|
| Bat | 0.6 |
| Cat | 0.67 |
| Dog | 0.45 |
| Penguin | 0.892 |

Video $V_2$

| Object name | Probability |
|---|---|
| Bat | 0.6 |
| Cat | 0.517 |
| Dog | 0.93 |
| Penguin | 0.81 |

FIG. 5

AUTOMATIC LARGE SCALE VIDEO OBJECT RECOGNITION

BACKGROUND

1. Field of Art

The present invention generally relates to the field of digital video, and more specifically, to methods of identifying real-world objects present within a video.

2. Background of the Invention

Currently, automated recognition within a digital video of images of real-world objects of interest to a user, such as people, animals, automobiles, consumer products, buildings, and the like, is a difficult problem. Conventional systems, to the extent that they allow for such recognition at all, typically use supervised learning which requires training sets of images that have been manually labeled as representing particular objects. Thus, such conventional systems rely on direct human input to provide object exemplars explicitly labeled as representing the object, such as a set of images known to include, for example, dogs, based on prior human examination. However, such human input is expensive, time-consuming, and cannot scale up to handle very large data sets comprising hundreds of thousands of objects and millions of images. This is particularly a problem in the context of video hosting systems, such as Google Video or YouTube, in which users submit millions of videos, each containing numerous distinct visual objects over the length of the video. The use of unsupervised learning techniques, in which the explicit input of human operators is not required to learn to recognize objects, has not yet been achieved for large-scale image recognition systems.

SUMMARY

An object recognition system provides automatic learning of objects in a large-scale video system. The object recognition system is configured to perform a number of rounds of dimensionality reduction and consistency learning on visual content items such as videos and still images. The dimensionality reduction and consistency learning produce feature vectors that accurately represent the features of visual objects associated with given object names. Consistency learning comprises comparing a feature vector to other feature vectors, such as those for the same object name, and those for different object names, and calculating a score based on the comparisons. A best model for a given object name is achieved where the feature vectors for the object name produced by the rounds of dimensionality reduction and consistency learning are sufficiently similar, e.g. as determined by application of clustering algorithms.

The feature vectors are stored in association with the object name which they represent and with an indication of the number of rounds of dimensionality reduction and consistency learning that produced them. The feature vectors and the indication can be used for various purposes, such as quickly determining a visual content item containing a visual representation of a given object name.

In one embodiment, a computer-implemented method obtains a plurality of object names, and for each object name, performs a number of actions. The actions comprise selecting a plurality of visual content items from a visual content repository, the visual content items having associated textual descriptions that are related to the object name, and segmenting each of the selected visual content items to produce a plurality of visual objects. The actions further comprise extracting feature vectors from the visual objects and associating with the object name the feature vectors extracted from the visual objects having that object name. The actions further comprise performing a plurality of dimensionality reduction rounds on the feature vectors, each round producing reduced feature vectors as input for the next round, thereby producing a first set of reduced feature vectors. The actions further comprise performing consistency learning on the reduced feature vectors by retaining as the learned feature vectors associated with the object name, those reduced feature vectors that have a threshold measure of similarity to the other reduced features vectors associated with the object name. The number of dimensionality reductions performed on the feature vectors for an object name in order to reach the minimum measure of similarity can vary with respect to different ones of the object names. The actions further comprise storing the object name in association with its learned feature vectors, and with an indicator of the number of dimensionality reduction rounds performed on its learned feature vectors.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 3A and 3B are tables depicting the application of dimensionality reduction and consistency learning to a set of feature vectors, according to one embodiment.

FIG. 4 is a table depicting a data structure for finding the best models for object names, according to one embodiment.

FIG. 5 is a table depicting the conceptual structure of a recognition repository, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
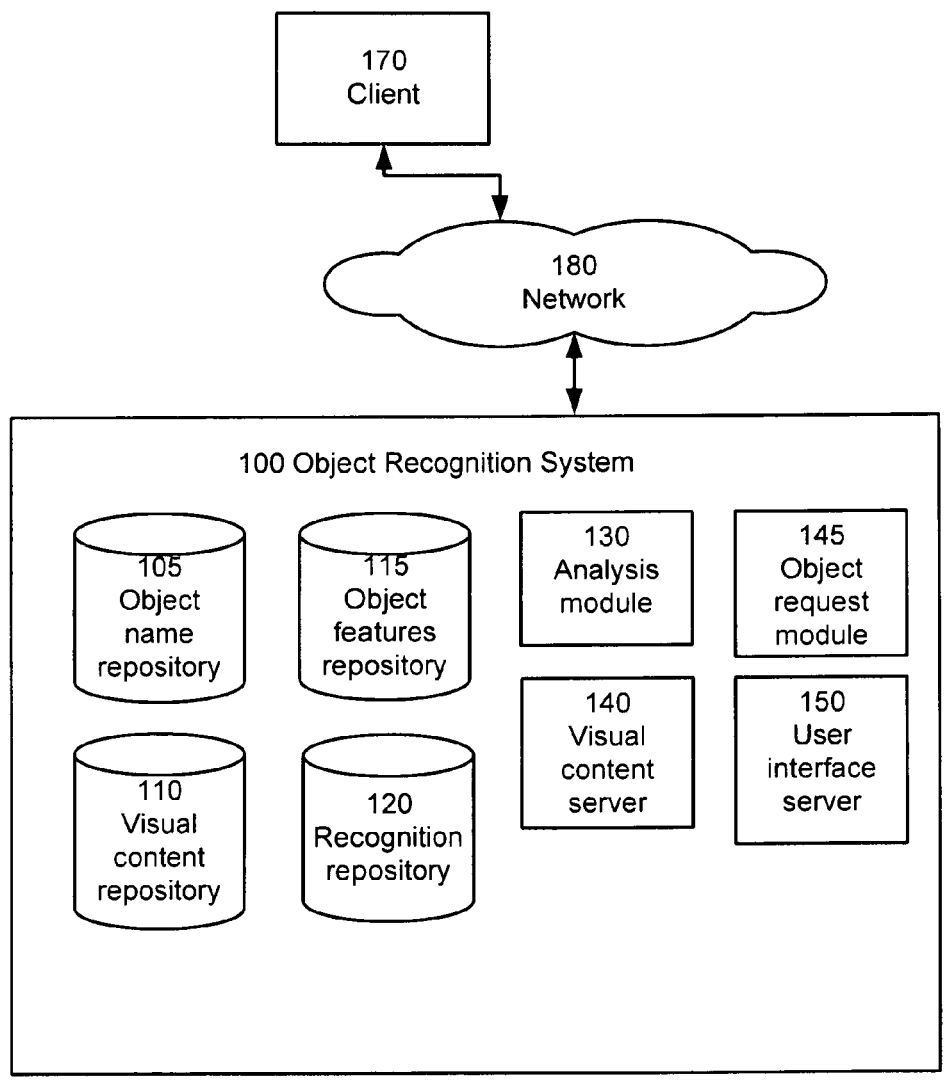
FIG. 1 is a block diagram of an object recognition system in accordance with one embodiment of the present invention.

FIG. 1 illustrates the architecture of an object recognition system allowing unsupervised learning and recognition of objects within videos or still images, hereinafter together referred to simply as "visual content items." Examples of videos include files in MP4 or QuickTime format, and examples of still images include files in Joint Photographic Experts Group (JPEG), Tagged Image File Format (TIFF), Graphics Interchange Format (GIF), Windows bitmap (BMP), or Portable Network Graphics (PNG) formats. An object recognition system 100 comprises collections of video and image content, and further comprises modules to analyze the images to learn characteristics of different objects and to recognize objects based on the learned characteristics.

A client device 170, such as a user's personal computer, can communicate with the object recognition system 100 via a network 180, performing actions such as submitting visual content (e.g. videos or images) or requesting visual content displaying a specified object. The method of communication is not limited to any particular user interface or network protocol, but in a typical embodiment a user interacts with the video hosting service via a conventional web browser of the client device 170, which employs standard Internet protocols.

The object recognition system 100 stores a set of object names 105 representing different possible real-world objects. For example, in one embodiment the object names 105 include nouns representing physical objects such as "aardvark," "antelope," "bicycle," "Bill Clinton," "car," "Eiffel Tower," "Porsche 911s," "South African penguin," "swimming pool," "zebra," and the like, though in other embodiments object name repository 105 also includes those representing more abstract concepts, verbs, and the like. In some embodiments, the various object names can include associated foreign language equivalents to enable object recognition in multiple languages. In one embodiment, the object name repository 105 is stored as a table of a conventional relational database management system, though other representations are equally possible.

The object recognition system 100 further comprises a visual content repository 110. The visual content repository 110 stores image data in which objects may be recognized, such as videos, still images, or both. For example, the visual content repository 110 could include a repository of user-submitted videos, such as that of Google Video or YouTube, and could also include still images, such as those indexed by Google Image Search. Images may also be obtained from online commercial image databases, photo-sharing websites, or the like. Preferably, each image has associated metadata such as keywords, tags, or a textual description of the image.

An object features repository 115 stores data for each object representing the visual characteristics of the objects identified within the visual content repository 110. In one embodiment, the characteristics are represented as feature vectors, each feature vector storing a set of values representing an attribute of an object or a portion thereof. Feature vectors may describe any one of a number of different possible visual attributes, such as color intensity, luminosity, texture, edge, wavelet or other transforms, optical flow, motion, and the like. An object may be represented by a single feature vector, or it may be represented by a number of different feature vectors, each describing a different portion of the object such as a region around a point of particular interest, such as a pixel that is a locus of attribute discontinuities, or a different attribute of the object, such as its color, texture, and so forth.

A recognition repository 120 stores, for each visual content item of the visual content repository 110 that has been analyzed and for some set of object names within the object name repository 105, probability scores that the visual content item contains an object designated by the object names. The set of object names could be all object names in the object name repository 105, or it could be some proper subset thereof, such as those object names having probabilities over some specified threshold. The recognition repository 120 is useful for a variety of applications, such as retrieving visual content items matching user queries.

An analysis module 130 selects an object name in the object name repository 105, and then selects (e.g., identifies) a plurality of visual content items from the visual content repository 110 corresponding to the selected object name. The analysis module 130 analyzes the visual content of these selected images, extracting image characteristic data, processing it, and storing it in the object features repository 115 and recognition repository 120. The processing of the image characteristic data can include dimensionality reduction and consistency learning operations, which reduce the quantity of the data and improve its quality. This process learns object characteristics without the need for human supervision, and the resulting data can then be used to perform efficient object recognition in new visual content items, even those for which no substantive information about the content is known a priori. The information derived from this object recognition can further be stored and later used for purposes such as suggesting visual content items in response to the submission of user queries.

The object recognition system 100 also comprises an object request module 145, which responds to requests for visual content items depicting a given object, e.g. a user-provided query, such as "South African penguin." For example, the object request module 145 could determine which visual content items from the visual content repository 110 best correspond to the query though examination of the recognition repository 120, returning those visual content items to the requester.

A user interface server 150 provides a user interface, such as a web-based interface, which a user may use to interact with the object recognition system 100, e.g. to request visual content featuring specified recognized objects. The user interface server 150 may be implemented as a conventional web server process, for example.

The object recognition system 100 further comprises a visual content server 140. The visual content server 140 fulfills user requests for given visual content items such as videos and still images from the visual content repository 110, e.g. those submitted by a user by clicking on a link to a video on a web page generated by the user interface system 150, by transferring the data representing the video to the user's computer. Data transfer typically takes place in the form of video streaming.

The object recognition system 100 need not be embodied in a single physical machine, but rather may be partitioned across multiple physical machines or logical storage units in a number of different manners. For example, the repositories 105-120 may all be stored within a single relational database management system, e.g. as different tables of a single database, or may be stored on separate machines, or may be partitioned or duplicated across machines. The different types of visual content within the visual content repository 110, such as still images and videos, may likewise be stored in separate repositories on separate machines, such as one repository for still images and another for video, either of which may be partitioned across multiple machines. Similarly, the analysis module 130 and the object recognition module 135 may execute on a machine separate from the repositories 105-120, or separate from each other. Likewise, a server 140-150, such as the user interface server 150, could execute on a separate machine.

Process of Computer Vision Analysis

Figure 2:
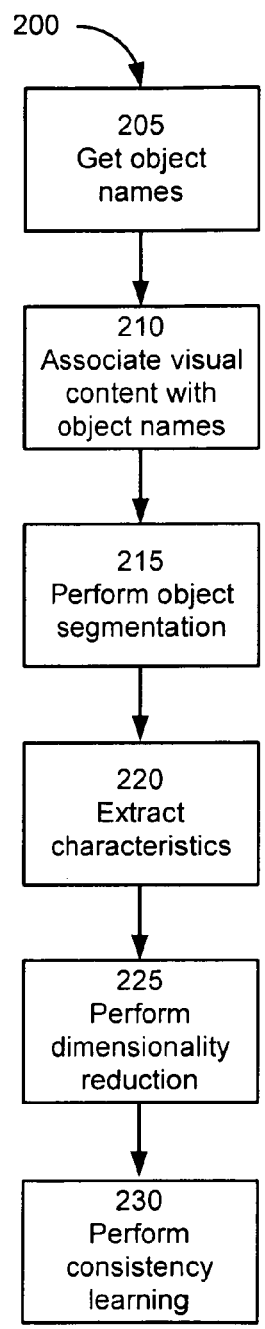
FIG. 2 is a diagram illustrating a high-level view of an image processing pipeline carried out by the analysis module for performing unsupervised learning of object identities.

FIG. 2 is a diagram illustrating a high-level view of an image processing pipeline carried out by the analysis module 130 for performing unsupervised learning of object identities. Initially, a set of object names is obtained 205, the object names comprising words and/or phrases representing the various possible objects that might be present within visual content repository 110. In one embodiment, in order to provide a comprehensive set of possible objects, object names are obtained from a large pre-existing collection of words, such as a lexical data from WordNet from Princeton University, or an index from a search engine such as that provided by Google, Inc. Other sources of object names include commercial or non-commercial databases, online dictionaries, online semantic networks, and the like. Object names from multiple sources can be combined, as well. If such a collection has associated grammatical information, such as the part of speech of the various entries, then the nouns or other words or phrases most likely to represent a physical object can be extracted from the collection, and the remainder discarded. These object names are then stored in the object name repository 105 for future use. Such a collection of object names might have, for example, 50,000 to 500,000 or more distinct object names.

Object Names can be Stored in a Single Language or in Multiple Languages.

visual content is then associated 210 with the object names. In one embodiment, each object name is used as a query to the visual content repository to obtain still images and/or videos associated with the respective object name. For example, for the object name "penguin," a query for "penguin" is submitted to the visual content repository 110 and a set of matching visual content items returned based on a match between the object name and metadata associated with the an visual content item. Such metadata could be a description associated with the visual content item by a submitter of the item at the time that the item was submitted to the visual content repository 110, e.g. a string "Funny South African penguins—penguins are adorable." The match algorithm can vary in different embodiments, such as a literal (string) match in one embodiment, to a match based on a semantic relationship (e.g. synonyms or phrases, or natural language processing techniques) in another embodiment, or to a relevance-based information retrieval type match (e.g., statistical methods based on term co-occurrence). Matching the query against submitter-provided descriptive metadata approximates supervised learning by leveraging data specified by a human with knowledge about the visual content item, without requiring actual human intervention during the learning process itself. The resulting mapping between object names and associated visual content items could be stored in a variety of ways, such as a table of a relational database management system. In a typical embodiment, each object name may be associated with dozens, even hundreds or thousands of matching visual content items, given a sufficiently large visual content repository 110. Thus the object name "Eiffel Tower," when used a as query, may result in associations with thousands of images and videos. This ability to automatically match a large number of labeled images to the object names, to serve as exemplars of object recognition training, is one beneficial feature of the present invention. In some embodiments, there may be a minimum number of visual content items required for a given object name, such that visual content analysis for the object name will not be available until the visual content repository 110 contains at least the minimum number of visual content items, thus assuring a sufficient level of quality for content analysis. Similarly, there may be a specified maximum number of visual content items, thus avoiding an unnecessary amount of computation during content analysis. In this case, additional visual content items beyond the maximum are either rejected or replace an existing visual content item deemed to be less valuable according to some algorithm, such as an algorithm examining the strength of a match on keywords or other metadata, the file size, the date of the visual content item submission, and the like.

With a set of matching visual content items identified for the object names in the object name repository 105, the analysis module 130 then performs image segmentation on each of the visual content items, resulting in a set of visually distinct but as-yet unidentified visual objects. A visual object comprises one or more substantially continuous extents of pixels of an image that are deemed to form a coherent visual entity. Image segmentation preferably identifies objects that would be considered foreground visual objects, rather than background visual objects. For example, in an image of a person standing in front of a building, the pixels comprising the person would form a visual object being in the foreground, distinct from the building in the background. Further, not all visual objects may actually represent the object names for which they were found, since it is common that photographs and especially videos contain many different objects that can be programmatically identified. For example, if a video was retrieved matching the word "penguin," many of the visual objects extracted by the segmentation process would not be of penguins, but of other entities, such as polar bears, icebergs, clouds, and the like. This is particularly the case when a visual content item is "spam" described as representing one thing, but actually representing another, such as a video described as depicting a popular event, but actually containing a product advertisement.

Different image segmentation algorithms may be employed in different embodiments, such as adaptive background subtraction, spatial and temporal segmentation with clustering algorithms, and other algorithms known to those of skill in the art. In one embodiment, a mean shift algorithm is used, which employs clustering within a single image or frame of a video. In segmentation based on the mean shift algorithm, an image is converted into tokens, e.g. by converting each pixel of the image into a corresponding value, such as color value, gradient value, texture measurement value, etc. Then windows are positioned uniformly around the data, and for each window the centroid—the mean location of the data values in the window—is computed, and each window re-centered around that point. This is repeated until the windows converge, i.e. a local center is found. The data traversed by windows that converged to the same point are then clustered together, producing a set of separate image regions. In the case of a video, the same or similar image regions typically exist across video frames, e.g. a region representing the same face at the same location across a number of frames, or at slightly offset locations. In this case, one of the set of similar regions can be chosen as representative and the rest discarded, the data associated with the images may be averaged, or representative frames may be chosen. Alternatively, a more complex statistical model such as principal component analysis (PCA) may be employed.

The result of application of a segmentation algorithm to a visual content item is a set of distinct objects, each occupying one of the regions found by the segmentation algorithm. Since different segmentation algorithms—which include differently parameterized versions of a given algorithm—tend to produce non-identical results, in one embodiment multiple segmentation algorithms are used, and objects that are sufficiently common across all the segmentation algorithm results sets are retained as representing valid objects. For example, multiple versions of a mean shift algorithm, each using a different window size, can be used along with multiple versions of a cluster algorithm, using different clustering parameters. An object segmented by one algorithm could be considered the same as that segmented by another algorithm if it occupies substantially the same region of the visual content object as the other segmented object, e.g. the various objects output by the methods having some significant percentage of their pixels in common, where the percentage can be, for example, 90% or more; a high threshold percentage results in a greater assurance that the same object was identified by the different algorithms. A visual object can be considered sufficiently common if it is the same, using this test, as objects in the result sets of all the other segmentation algorithms, or a majority or a set number or percentage thereof.

With a set of distinct objects segmented for each visual content item, image characteristics are extracted 220 for each object. In one embodiment, the characteristics are represented as feature vectors, lists of data pertaining to various attributes, such as color, texture, edge direction, motion, optical flow, luminosity, and the like. In one embodiment, the preferred attributes are color, where the color attributes may be represented in the RGB, HSV, and LAB color spaces, and texture, e.g. as represented with Gabor and/or Haar wavelets. In one embodiment, the feature vectors are extracted according to the scale-invariant feature transform algorithm (SIFT). In different embodiments, a given object may be represented by one feature vector, or by a number of feature vectors corresponding to different portions of the object, e.g. to points at which there is a sharp change between color values, or different attributes. In any case, the extracted feature vectors are then stored within the object features repository 115 in association with the object name to which they correspond, the set of feature vectors for the object name being known as a "model" for that object name. Thus, for example, assuming that the object name "Eiffel Tower" is associated with 1,000 images that have been selected by the query, this object name is then associated with visual objects extracted from such images, and the feature vector(s) further derived from such visual objects.

The feature vector data when extracted are frequently not in an ideal state, containing a large number of feature vectors, some of which are irrelevant, adding no additional information. The potentially large number and low quality of the feature vectors increases the computational cost and reduces the accuracy of later techniques that analyze the feature vectors. In order to reduce the size and improve the quality of the feature vector data, the analysis module 130 therefore performs 225 a number of rounds of dimensionality reduction according to a chosen dimensionality reduction (DR) algorithm. The number of rounds performed may be a fixed number, e.g. 10, or it may be interleaved with rounds of consistency learning, as described more below. Different embodiments may employ different algorithms for this purpose, including principal component analysis (PCA), linear discriminant analysis (LDA), multi-dimensional scaling (MDS), Isomap, locally linear embedding (LLE), and other similar algorithms known to those of skill in the art. The result of application of a dimensionality reduction algorithm to a first set of feature vectors is a second, smaller set of vectors representative of the first set. For example, FIG. 3A depicts the feature vectors for a set of 4 object names, "Bat", "Cat", "Dog", and "Penguin," at a first stage $DR_0$, in which no dimensionality reduction has yet been performed and thus the feature vectors associated with each object are those originally extracted for the object during the feature vector extraction step. In the example of FIG. 3A, the object name "Cat" is represented at stage $DR_0$ by a model consisting of the feature vectors $O_1$, $O_4$, $O_5$, and $O_6$, representing 4 visually distinct objects or distinct regions of an object, and the object name "Dog" by feature vectors $O_1$, $O_6$, and $O_7$. For example, within a video from the visual content repository 110 entitled "Cats at play" and matching the object name "Cat", e.g. a video depicting two kittens playing with a dog, a number of different visual objects could be found, such as a dog, from which feature vector $O_1$ has been extracted, two different cats, corresponding to feature vectors $O_4$ and $O_5$, and a ball of wool corresponding to feature vector $O_6$. In embodiments in which each visual object is represented by multiple feature vectors, each $O_i$ can be thought of as a set of feature vectors associated with the object.

Column $DR_1$ of FIG. 3B represents the feature vectors of FIG. 3A after one round of dimensionality reduction. For example, the feature vectors for the object name "Cat" have been reduced and altered from the four feature vectors $O_1$, $O_4$, $O_5$, and $O_6$ to $O_1$, $O_4'$, $O_5$, eliminating $O_4$ and $O_6$ and substituting a modified feature vector $O_4'$. Note that FIGS. 3A and 3B are purely for the purpose of example, and it is expected that in practice there will be many thousands of object names, with each having large numbers of feature vectors, as well as multiple rounds of dimensionality reduction and consistency learning. In addition, it is expected that various feature vectors can represent different portions of the same object, or the same real-world entity (e.g., a cat) in different locations at different times in video, for example. In one embodiment, multiple rounds of dimensionality reduction are computed for the feature vectors of each object name, with the output of one round serving as the input for the next round for the same object name. The results of each round for each object name can be stored in the object features repository in association with the object name and the round number. In another embodiment, a round of dimensionality reduction is computed, then consistency learning is performed as described below, with the output of the consistency learning being used as the input to the next round of dimensionality reduction.

Thus, at this point there are data representing the feature vectors resulting from one or more rounds of dimensionality reduction, for each object name in the set. However, as previously noted the feature vectors may correspond to objects not representing the object name in question. In the example above, for instance, the feature vectors for the object name "Cat" include a feature vector representing a dog and another representing a ball of wool. Or, as noted above, a particular visual content item may be "spam" with misrepresented subject matter. These problems are addressed by comparing feature vectors within and across object names. More specifically, the analysis module 130 performs 230 consistency learning (CL) on the data in order to eliminate feature vectors that are not truly representative of the object name. In one embodiment, this is accomplished by comparing each feature vector for a given object name at a given level of dimensionality reduction both to the other feature vectors for the object name and level of dimensionality reduction ("in-class" comparisons), and to feature vectors for other object names at the same level of dimensionality reduction ("out-of-class" comparisons), and computing a score for each feature vector as a result of the comparison match degree. The match degree may be computed in different ways in different embodiments, or for different types of feature vectors. Higher degrees of in-class matches increase the score for the feature vector, while higher degrees of out-of-class matches reduce it, on the theory that similarity to objects purported to represent the given object name is an indication that it does represent the object, and similarity to objects purported to represent other types of objects indicates that it does not. Feature vectors receiving sufficiently low scores, e.g. scores below a fixed threshold value, are discarded from the set as likely not being representative of the object name.

Column $CL_1$ of FIG. 3B represents the feature vectors of the object names of FIG. 3A after consistency learning is applied to the feature vectors of column $DR_1$. Regarding the feature vectors for the object name "cat," feature vector $O_1$ has been discarded as being found to have a high degree of match within the set of feature vectors for "cat" and within the set of feature vectors for "dog," while also not having a strong match with $O_4'$ and $O_5$, the other feature vectors for "cat." Since in the example $O_1$ was a feature vector corresponding to an image for "dog," its exclusion is in fact appropriate.

The operations of dimensionality reduction and consistency learning continue for each object name in the object name repository 105 until the set of feature vectors for that object name stabilizes or converges, and thereby indicates that the feature vectors are of sufficient quality, the model consisting of this set of feature vectors being known as the "classification model" of a visual object designated by the object name. In one embodiment, the quality of a model for an object name is evaluated based on the degree of similarity between the feature vectors in the set of feature vectors associated with the object name, following the one or more rounds of dimensionality reduction and consistency learning. For example, the similarity can be determined using a vector clustering algorithm that segregates the feature vectors for a given object name into a number of clusters, e.g. using k-means clustering, agglomerative clustering, or other clustering algorithms known to those of skill in the art. Then, the number of distinct clusters and the number of feature vectors in each cluster can be computed and compared to a threshold to determine whether the feature vectors in the set for the object name are sufficiently similar. For example, in one embodiment the set of feature vectors is considered sufficiently similar if the clustering algorithm produces seven or fewer clusters. If the feature vectors of a given round of consistency learning exhibit the requisite degree of similarity, then the number of the round is stored in association with the object name and the set of feature vectors within a portion of the object features repository 115. At this stage, it can be said that each visual object has been identified or "named." For purposes of convenience, then, a "named object" refers to the combination of an object name and its classification model (reduced feature vector set). Each object name may require a different number of rounds of dimensionality reduction and consistency learning before the resulting feature vectors for that object name have the requisite similarity. FIG. 4 depicts the resulting portion of the object features repository 115, according to one embodiment, where the "Number of Rounds" column stores the indicator of the number of rounds of dimensionality reduction and consistency learning needed to arrive at the classification model for a given named object. The classification models can be stored in relation to each other, e.g. clustered according to a calculated similarity between their respective feature vector sets.

Process of Video Classification

With the object features repository 115 constructed according to the process described above, the object recognition module 135 can determine whether named objects are present within a video by comparing the model for an object name with a corresponding set of feature vectors for the video. The result of this comparison is an identification of one or more named objects whose classification model most closely matches the feature vectors of the video. This approach has various useful applications, such as estimating which videos, images, or other visual content items contain a named object corresponding to a keyword (e.g., an object name) specified in a user query.

More specifically, a visual content item, such as a video V, is received, and typically added to the visual content repository 110. The visual content item can be entirely new to the object recognition system 100, never having been analyzed before; alternatively, the visual content item can already exist in the repository 110 but have not yet been subject to analysis and therefore not yet have an associated classification model. The video V is then segmented as discussed above with respect to step 215 of FIG. 2. Similarly, a number of rounds of dimensionality reduction and consistency learning are performed as in steps 225 and 230, with the resulting feature vectors being stored for each round. Then, for each object name in the object name repository 105 (or for a selected subset thereof, such as those objects stored in the same cluster of feature vectors), the number of rounds required to arrive at the classification model for that object name is looked up in the object features repository 115, as depicted in FIG. 4. The set of feature vectors computed for the video V for that number of rounds is then retrieved and compared to the classification model for the object name. The comparison may be performed using the same feature vector comparison techniques discussed above with respect to the consistency learning stage. The result of this comparison is a numerical score indicating a probability that the video contains an object corresponding to the object name (i.e., quantifying the strength of the match with the classification model feature vectors associated with the object name). When this process is completed with respect to the object names, the result, stored in recognition repository 120, is a list of probabilities (or similar measures) that the video contains an image of the various object names of the object name repository 105. Given the number of object names, it is not necessary to store all of the resulting probabilities, since the vast majority thereof will not be significant in value; accordingly, only the top 10, 100, or some other number of the object names may be stored. In this manner, a given video can be automatically labeled with the top scoring object names.

This process beneficially allows labeling videos which may have few or no human-provided labels or tags. Another use is to verify or supplement the labels that have been provided with a video or other visual content item. For example, users frequently provide labels or tags that are incorrect or misleading—essentially "spamming" a video. The method described herein will automatically generate a set of labels from the named objects found in the video. This generated set of labels can be compared with any human provided labels, and those human provided labels that do no match can be discarded. Alternatively, or additionally, for labels that are already associated with a video, the feature vectors for the named objects matching such labels can be retrieved and compared against the feature vectors derived from the video. The expectation is that if the video is correctly labeled by a human, then the feature vectors from the video itself should have a significant degree of match with the named objects corresponding to such labels. Thus, if there is no such match, the human-provided label can be discarded, or demoted in some fashion.

FIG. 5 depicts the conceptual structure of the recognition repository 120 according to one embodiment. For each of two illustrated videos, $V_1$ and $V_2$, each object name (limited for purposes of this example to four) has an associated probability. In the example of FIG. 5, for instance, there is a 60% probability that video $V_1$ contains an image of a bat, and an 81% probability that video $V_2$ contains the image of a penguin. Again, the probability values here are derived from a match between the respective feature vectors for $V_1$ and $V_2$, and the feature vectors for the named objects for "bat", "cat", "dog", and "penguin."

Another application for this approach is the retrieval of videos or other visual content that is relevant to a text query. For example, if a query for "penguin" were submitted via the user interface 150, the object request module 145 could examine the portion of the recognition repository 120 associated with each video V, ranking the videos in descending order of the probability associated with the object name "penguin," and presenting the ranked videos via the user interface 150. This would present the user with the videos that are most likely to contain an image of a penguin. For faster query processing times, a list of the videos having the highest probability scores can be pre-computed for each object name and simply retrieved in response to a query having that object name. Queries comprising multiple object names can be evaluated in a variety of different ways, such as weighting the probability associated with each object name, or other techniques known to those of skill in the art. Although the conceptual structure of FIG. 5 depicts each video as having its own separate tabular data structure, many alternate implementations are equally possible. For example, a single large M×N matrix could be employed, the matrix having one row for each of the M videos, with each row having N columns, one per object name.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method for generating a classification model of visual objects present in visual content items stored in a visual content repository, each visual content item having a textual description, the method comprising:
   for each of a plurality of object names, automatically selecting a plurality of visual content items from the visual content repository, extracting feature vectors from the visual content items, and performing a number of dimensionality reduction rounds on the feature vectors, each round producing reduced feature vectors as input for the next round, thereby producing multiple sets of reduced feature vectors for each object name;
   for each object name, performing consistency learning on the sets of reduced feature vectors, until one of the sets of reduced feature vectors for the object name has a minimum measure of similarity to the other feature vectors associated with the object name; and
   storing as the classification model for each object name, the set of reduced feature vectors which have the minimum measure of similarity.

2. The method of claim 1, wherein the number of dimensionality reductions performed on the feature vectors for an object name in order to reach the minimum measure of similarity varies with respect to different ones of the object names.

3. The method of claim 1, wherein the classification model for an object name includes an indicator of the number of dimensionality reduction rounds performed on its learned feature vectors.

4. The method of claim 1, wherein the plurality of visual content items are automatically selected from the visual content repository based at least in part on a relationship between the object name and the textual descriptions of the visual content items.

5. The method of claim 1, further comprising:
receiving a visual content item for which no classification model has yet been stored;
performing a plurality of dimensionality reduction and consistency learning rounds on the received visual content item, each round resulting in a set of feature vectors associated with the visual content item;
identifying object names of the plurality of object names having classification models similar to the feature vectors associated with the received visual content item;
producing probabilities that the received visual content item contains visual representations corresponding to the object names; and
storing the probabilities in a recognition repository in association with their respective object names and with the received visual content item.

6. The method of claim 5, wherein producing probabilities that the received visual content item contains visual representations corresponding to the object names comprises:
for each object name of the plurality of identified object names:
identifying the object name's learned feature vectors that correspond to the indicator of the number of dimensionality reductions for the object name;
identifying the received visual content item's feature vectors that correspond to the indicator of the number of dimensionality reductions for the object name; and
comparing the identified feature vectors for the object name to the identified feature vectors for the received visual content item, thereby producing a probability that the received visual content item contains a visual representation corresponding to the object name.

7. The method of claim 5, further comprising determining, for an object name, a plurality of visual content items in the visual content repository having the highest probabilities of containing a visual representation of the object name, the determining based at least in part on the probabilities of the recognition repository.

8. The method of claim 5, further comprising:
identifying a plurality of object names having the highest probabilities of having a visual representation within a first visual content item in the visual content repository; and
revising a list of labels within metadata associated with the first visual content item, based at least in part on the identified plurality of object names.

9. The method of claim 1, wherein a classification model is considered to have the minimum measure of similarity to the feature vectors associated with the received visual content item if the classification model's feature vectors have been stored in the same cluster of feature vectors as the feature vectors associated with the received visual content item, according to a feature vector clustering algorithm.

10. The method of claim 1, wherein the set of object names comprises at least 50,000 entries.

11. The method of claim 1, further comprising extracting the plurality of object names from one of a group consisting of a lexical database and a search engine index.

12. The method of claim 1, wherein the textual descriptions of the visual content items are related to the object names by semantic similarity.

13. The method of claim 1, wherein the textual descriptions of the visual content items literally contain the object names.

14. The method of claim 1, wherein performing consistency learning comprises computing a measure of similarity for a feature vector based at least in part on comparisons between the feature vector and other feature vectors, wherein matches between the feature vector and other feature vectors for the same object name increase the score, and matches between the feature vector and feature vectors for different object names decrease the score.

15. An object recognition system for generating a classification model for recognizing a visual object, the system comprising:
an object name repository storing a plurality of object names;
a visual content repository storing a plurality of visual content items;
a recognition repository storing associations of object names with feature vectors and with a number of dimensionality reduction rounds;
an analysis module adapted to:
for each of a plurality of object names form the object name repository, automatically select a plurality of visual content items from the visual content repository, extract feature vectors from the visual content items, and perform a number of dimensionality reduction rounds on the feature vectors, each round producing reduced feature vectors as input for the next round, thereby producing multiple sets of reduced feature vectors for each object name;
for each object name, perform consistency learning on the sets of reduced feature vectors, until one of the sets of reduced feature vectors for the object name has a minimum measure of similarity to the other feature vectors associated with the object name; and
store as the classification model for each object name, the set of reduced feature vectors which have the minimum measure of similarity.

16. The system of claim 15, wherein the number of dimensionality reductions performed on the feature vectors for an object name in order to reach the minimum measure of similarity varies with respect to different ones of the object names.

17. The system of claim 15, wherein the classification model for an object name includes an indicator of the number of dimensionality reduction rounds performed on its learned feature vectors.

18. The system of claim 15, wherein the plurality of visual content items are automatically selected from the visual content repository based at least in part on a relationship between the object name and the textual descriptions of the visual content items.

19. The system of claim 15, the analysis module further adapted to:
receive a visual content item for which no classification model has yet been stored;
perform a plurality of dimensionality reduction and consistency learning rounds on the received visual content item, each round resulting in a set of feature vectors associated with the visual content item;
identify object names of the plurality of object names having classification models similar to the feature vectors associated with the received visual content item;
produce probabilities that the received visual content item contains visual representations corresponding to the object names; and store the probabilities in the recognition repository in association with their respective object names and with the received visual content item.

20. The system of claim 19, wherein producing probabilities that the received visual content item contains visual representations corresponding to the object names comprises:
for each object name of the plurality of identified object names:
identifying the object name's learned feature vectors that correspond to the indicator of the number of dimensionality reductions for the object name;
identifying the received visual content item's feature vectors that correspond to the indicator of the number of dimensionality reductions for the object name; and
comparing the identified feature vectors for the object name to the identified feature vectors for the received visual content item, thereby producing a probability that the received visual content item contains a visual representation corresponding to the object name.

21. The system of claim 19, further comprising an object request module that determines, for an object name, a plurality of visual content items in the visual content repository having the highest probabilities of containing a visual representation of the object name, the determining based at least in part on the probabilities of the recognition repository.

22. The system of claim 19, the actions of the analysis module further comprising:
identifying a plurality of object names having the highest probabilities of having a visual representation within a first visual content item in the visual content repository; and
revising a list of labels within metadata associated with the first visual content item, based at least in part on the identified plurality of object names.

23. The system of claim 15, wherein a classification model is considered to have the minimum measure of similarity to the feature vectors associated with the received visual content item if the classification model's feature vectors have been stored in the same cluster of feature vectors as the feature vectors associated with the received visual content item, according to a feature vector clustering algorithm.

24. The system of claim 15, wherein the object name repository comprises at least 50,000 object names.

25. The system of claim 15, the actions of the analysis module further comprising extracting the plurality of object names from one of a group consisting of a lexical database and a search engine index.

26. The system of claim 15, wherein the textual descriptions of the visual content items are related to the object names by semantic similarity.

27. The system of claim 15, wherein the image textual descriptions of the visual content items literally contain the object names.

28. The system of claim 15, wherein performing consistency learning comprises computing a measure of similarity for a feature vector based at least in part on comparisons between the feature vector and other feature vectors, wherein matches between the feature vector and other feature vectors for the same object name increase the score, and matches between the feature vector and feature vectors for different object names decrease the score.

29. A non-transitory computer readable storage medium storing a computer program executable by a processor for generating a classification model of visual objects present in visual content items stored in a visual content repository, each visual content item having a textual description, the actions of the computer program comprising:
for each of a plurality of object names, automatically selecting a plurality of visual content items from the visual content repository, extracting feature vectors from the visual content items, and performing a number of dimensionality reduction rounds on the feature vectors, each round producing reduced feature vectors as input for the next round, thereby producing multiple sets of reduced feature vectors for each object name;
for each object name, performing consistency learning on the sets of reduced feature vectors, until one of the sets of reduced feature vectors for the object name has a minimum measure of similarity to the other feature vectors associated with the object name; and
storing as the classification model for each object name, the set of reduced feature vectors which have the minimum measure of similarity.

30. The non-transitory computer readable storage medium of claim 29, wherein the number of dimensionality reductions performed on the feature vectors for an object name in order to reach the minimum measure of similarity varies with respect to different ones of the object names.

31. The non-transitory computer readable storage medium of claim 29, wherein the classification model for an object name includes an indicator of the number of dimensionality reduction rounds performed on its learned feature vectors.

32. The non-transitory computer readable storage medium of claim 29, wherein the plurality of visual content items are automatically selected from the visual content repository based at least in part on a relationship between the object name and the textual descriptions of the visual content items.

33. The non-transitory computer readable storage medium of claim 29, further comprising:
receiving a visual content item for which no classification model has yet been stored;
performing a plurality of dimensionality reduction and consistency learning rounds on the received visual content item, each round resulting in a set of feature vectors associated with the visual content item;
identifying object names of the plurality of object names having classification models similar to the feature vectors associated with the received visual content item;
producing probabilities that the received visual content item contains visual representations corresponding to the object names; and
storing the probabilities in a recognition repository in association with their respective object names and with the received visual content item.

34. The non-transitory computer readable storage medium of claim 33, wherein producing probabilities that the received visual content item contains visual representations corresponding to the object names comprises:
for each object name of the plurality of identified object names:
identifying the object name's learned feature vectors that correspond to the indicator of the number of dimensionality reductions for the object name;
identifying the received visual content item's feature vectors that correspond to the indicator of the number of dimensionality reductions for the object name; and
comparing the identified feature vectors for the object name to the identified feature vectors for the received visual content item, thereby producing a probability that the received visual content item contains a visual representation corresponding to the object name.

35. The non-transitory computer readable storage medium of claim 33, further comprising determining, for an object name, a plurality of visual content items in the visual content repository having the highest probabilities of containing a visual representation of the object name, the determining based at least in part on the probabilities of the recognition repository.

36. The non-transitory computer readable storage medium of claim 33, further comprising:
identifying a plurality of object names having the highest probabilities of having a visual representation within a first visual content item in the visual content repository; and
revising a list of labels within metadata associated with the first visual content item, based at least in part on the identified plurality of object names.

37. The non-transitory computer readable storage medium of claim 29, wherein a classification model is considered to have the minimum measure of similarity to the feature vectors associated with the received visual content item if the classification model's feature vectors have been stored in the same cluster of feature vectors as the feature vectors associated with the received visual content item, according to a feature vector clustering algorithm.

38. The non-transitory computer readable storage medium of claim 29, wherein the set of object names comprises at least 50,000 entries.

39. The non-transitory computer readable storage medium of claim 29, further comprising extracting the plurality of object names from one of a group consisting of a lexical database and a search engine index.

40. The non-transitory computer readable storage medium of claim 29, wherein the textual descriptions of the visual content items are related to the object names by semantic similarity.

41. The non-transitory computer readable storage medium of claim 29, wherein the image textual descriptions of the visual content items literally contain the object names.

42. The non-transitory computer readable storage medium of claim 29, wherein performing consistency learning comprises computing a measure of similarity for a feature vector based at least in part on comparisons between the feature vector and other feature vectors, wherein matches between the feature vector and other feature vectors for the same object name increase the score, and matches between the feature vector and feature vectors for different object names decrease the score.

43. A computer implemented method of identifying visual content items relevant to a query, the method comprising:
storing a recognition repository having:
a plurality of object names, and
a plurality of associations between an object name, a visual content item, and a probability that the visual content item contains a visual representation corresponding to the object name;
receiving a query comprising an object name; and
identifying a plurality of visual content items having the highest probabilities of containing a visual representation of an object corresponding to the object name, based at least in part on the probabilities of the recognition repository.

* * * * *